(12) United States Patent
Bruce et al.

(10) Patent No.: US 9,619,668 B2
(45) Date of Patent: Apr. 11, 2017

(54) MANAGING APPLICATION DATA IN DISTRIBUTED CONTROL SYSTEMS

(71) Applicant: Axis AB, Lund (SE)

(72) Inventors: Mathias Bruce, Lund (SE); Robert Rosengren, Lund (SE)

(73) Assignee: AXIS AB, Lund (SE)

( * ) Notice: Subject to any disclaimer, the term of this patent is extended or adjusted under 35 U.S.C. 154(b) by 789 days.

(21) Appl. No.: 14/028,230

(22) Filed: Sep. 16, 2013

(65) Prior Publication Data

US 2015/0081737 A1   Mar. 19, 2015

(51) Int. Cl.
| | |
|---|---|
| G06F 17/30 | (2006.01) |
| G06F 21/62 | (2013.01) |
| G06F 9/48 | (2006.01) |
| G06F 11/18 | (2006.01) |
| G07C 9/00 | (2006.01) |

(52) U.S. Cl.
CPC ........ *G06F 21/6227* (2013.01); *G06F 9/4806* (2013.01); *G06F 11/182* (2013.01); *G07C 9/00* (2013.01)

(58) Field of Classification Search
CPC .. G06F 21/6227; G06F 9/4806; G06F 11/182; G07C 9/00
USPC ........................................ 707/966, 652, 785
See application file for complete search history.

(56) References Cited

U.S. PATENT DOCUMENTS

| | | | | |
|---|---|---|---|---|
| 6,014,669 A | * | 1/2000 | Slaughter | G06F 17/30581 707/610 |
| 6,449,641 B1 | * | 9/2002 | Moiin | G06F 9/5061 709/201 |
| 7,188,145 B2 | | 3/2007 | Lowery et al. | |
| 2002/0077996 A1 | * | 6/2002 | Regelski | G07C 9/00103 |
| 2002/0107934 A1 | * | 8/2002 | Lowery | G06F 17/3087 709/213 |
| 2003/0014465 A1 | | 1/2003 | Mugica et al. | |
| 2009/0070571 A1 | * | 3/2009 | Neely | G07C 9/00134 713/1 |
| 2009/0080443 A1 | * | 3/2009 | Dziadosz | G07C 9/00174 370/401 |
| 2011/0153737 A1 | | 6/2011 | Chu et al. | |
| 2012/0133482 A1 | | 5/2012 | Bhandari et al. | |

OTHER PUBLICATIONS

Extended European Search Report issued in corresponding European Application No. 13185582.7, 7 pages.

* cited by examiner

*Primary Examiner* — Evan Aspinwall
(74) *Attorney, Agent, or Firm* — Snyder, Clark, Lesch & Chung, LLP

(57) ABSTRACT

A device may correspond to a physical access controller in a distributed physical access control system. The device in a distributed system may include logic configured to detect a request from an application to access an application dataset, wherein the application dataset corresponds to a distributed dataset and determine whether the application dataset exists in the distributed system. The logic may be further configured to generate the application dataset in the distributed system, in response to determining that the application dataset does not exist in the distributed system, and send, to other devices in the distributed system, a request to join a dataset group that includes devices associated with the application dataset, in response to determining that the application dataset exists in the distributed system.

26 Claims, 12 Drawing Sheets

358 ⟶

| SYSTEM UNIT LIST
410 |
| DISTRIBUTED DATASET ID
420 |
| ⋮ |

| DISTRIBUTED DATSET ID
430 | SYSTEM UNIT
440-A | QUORUM
450 | APPLICATION DATA
460 |
|---|---|---|---|
| | ⋮ | | |
| | SYSTEM UNIT
440-N | | |

FIG. 4B

MANAGING APPLICATION DATA IN DISTRIBUTED CONTROL SYSTEMS

FIELD

This disclosure generally relates to access control systems, and more specifically, to managing application data in access control systems.

BACKGROUND INFORMATION

A distributed system may include components that communicate and coordinate their actions to achieve a set of tasks. For example, computers in a distributed system may communicate over a network in order to coordinate to solve an algorithm. In order to successfully coordinate simultaneous operations on independent computers, such as data and resource management or synchronization of processing steps, a distributed algorithm may need to be implemented. Various distributed algorithms have been developed to coordinate components of a distributed system.

SUMMARY

According to one aspect, a method, performed by a device in a distributed system, may include detecting, by the device, a request from an application to access an application dataset, wherein the application dataset corresponds to a distributed dataset; determining, by the device, whether the application dataset exists in the distributed system; creating, by the device, the application dataset in the distributed system, in response to determining that the application dataset does not exist in the distributed system; and sending, by the device and to other devices in the distributed system, a request to join a dataset group that includes devices associated with the application dataset, in response to determining that the application dataset exists in the distributed system.

Additionally, determining whether the application dataset exists in the distributed system may include accessing a list of identifiers of distributed datasets in the distributed system; and determining whether the list of identifiers of distributed datasets includes an identifier for the requested application dataset.

Additionally, the method may include adding information from the application to the created application dataset, in response to creating the application dataset.

Additionally, the method may include receiving, from another device in the distributed system, an indication that the device has been added to the dataset group; receiving, from the other device in the distributed system, the application dataset; and storing the received application dataset on the device.

Additionally, the received application dataset may include a list of devices that are members of the dataset group, and the method may further include sending a proposal to the devices that are members of the dataset group to add application data to the application dataset; obtaining consensus to add the application data to the application dataset, in response to sending the proposal; adding the application data to the application dataset, in response to obtaining the consensus.

Additionally, the method may include receiving, from another device in the distributed system, a request to join a dataset group of devices associated with the created application dataset; obtaining consensus to add the other device to the dataset group of devices associated with the created application dataset; and adding the other device to the dataset group of devices associated with the created application dataset, in response to obtaining the consensus to add the other device to the dataset group of devices associated with the created application dataset.

Additionally, obtaining consensus to add the other device to the dataset group of devices associated with the created application dataset may include sending a proposal to add the other device to the dataset group of devices associated with the created application dataset to the devices associated with the created application dataset; and obtaining a quorum of votes to add the other device to the dataset group of devices associated with the created application dataset.

Additionally, adding the other device to the dataset group of devices associated with the created application dataset may include sending the application dataset to the other device; and adjusting a quorum number required to obtain consensus in connection with the dataset group of devices associated with the created application dataset.

Additionally, the method may include receiving, from the other device in the distributed system, a request to change application data in the created application dataset; obtaining consensus to change the application data in the created application dataset; and changing the application data in the created application dataset, in response to obtaining the consensus to change the application data in the created application dataset.

Additionally, the method may include receiving, from the other device in the distributed system, a request to be removed from the dataset group of devices associated with the created application dataset; obtaining consensus to remove the other device from the dataset group of devices associated with the created application dataset; and removing the other device from the dataset group of devices associated with the created application dataset, in response to obtaining the consensus to remove the other device from the dataset group of devices associated with the created application dataset.

Additionally, the distributed system may include a distributed physical access control system, and wherein the device and the other devices correspond to physical access control units.

According to another aspect, a device in a distributed system, may include logic configured to detect a request from an application to access an application dataset, wherein the application dataset corresponds to a distributed dataset; determine whether the application dataset exists in the distributed system; create the application dataset in the distributed system, in response to determining that the application dataset does not exist in the distributed system; and send, to other devices in the distributed system, a request to join a dataset group that includes devices associated with the application dataset, in response to determining that the application dataset exists in the distributed system.

Additionally, when the logic is determining whether the application dataset exists in the distributed system, the logic may further be configured to access a list of identifiers of distributed datasets in the distributed system; and determine whether the list of distributed datasets includes an identifier for the requested application dataset.

Additionally, the logic may be further configured to add information from the application to the created application dataset, in response to creating the application dataset.

Additionally, the logic may be further configured to receive, from another device in the distributed system, an indication that the device has been added to the dataset group; receive, from the other device in the distributed system, the application dataset; and store the received application dataset on the device.

Additionally, the received application dataset may include a list of devices that are members of the dataset group, and the logic may be further configured to send a proposal to the devices that are members of the dataset group to add application data to the application dataset; obtain consensus to add the application data to the application dataset, in response to sending the proposal; and add the application data to the application dataset, in response to obtaining the consensus.

Additionally, the logic may be further configured to receive, from another device in the distributed system, a request to join a dataset group of devices associated with the created application dataset; obtain consensus to add the other device to the dataset group of devices associated with the created application dataset; and add the other device to the dataset group of devices associated with the created application dataset, in response to obtaining the consensus to add the other device to the dataset group of devices associated with the created application dataset.

Additionally, the logic may be further configured to receive, from the other device in the distributed system, a request to be removed from the dataset group of devices associated with the created application dataset; obtain consensus to remove the other device from the dataset group of devices associated with the created application dataset; and remove the other device from the dataset group of devices associated with the created application dataset, in response to obtaining the consensus to remove the other device from the dataset group of devices associated with the created application dataset.

Additionally, the distributed system may include a distributed physical access control system, and the device and the other devices may correspond to physical access control units.

According to yet another aspect, a distributed system may include a plurality of physical access control devices, wherein a particular one of the plurality of physical access control devices is configured to detect a request from an application to access an application dataset, wherein the application dataset corresponds to a distributed dataset; determine whether the application dataset exists in the distributed system; create the application dataset in the distributed system, in response to determining that the application dataset does not exist in the distributed system; and send, to other ones of the plurality of physical access control devices, a request to join a dataset group that includes devices associated with the application dataset, in response to determining that the application dataset exists in the distributed system.

BRIEF DESCRIPTION OF THE DRAWINGS

FIG. 4A is a diagram of exemplary information that may be stored in the system dataset of FIG. 3B;
FIG. 4B is a diagram of exemplary information that may be stored in the application dataset of FIG. 3B.

DETAILED DESCRIPTION OF PREFERRED EMBODIMENTS

Figure 1:
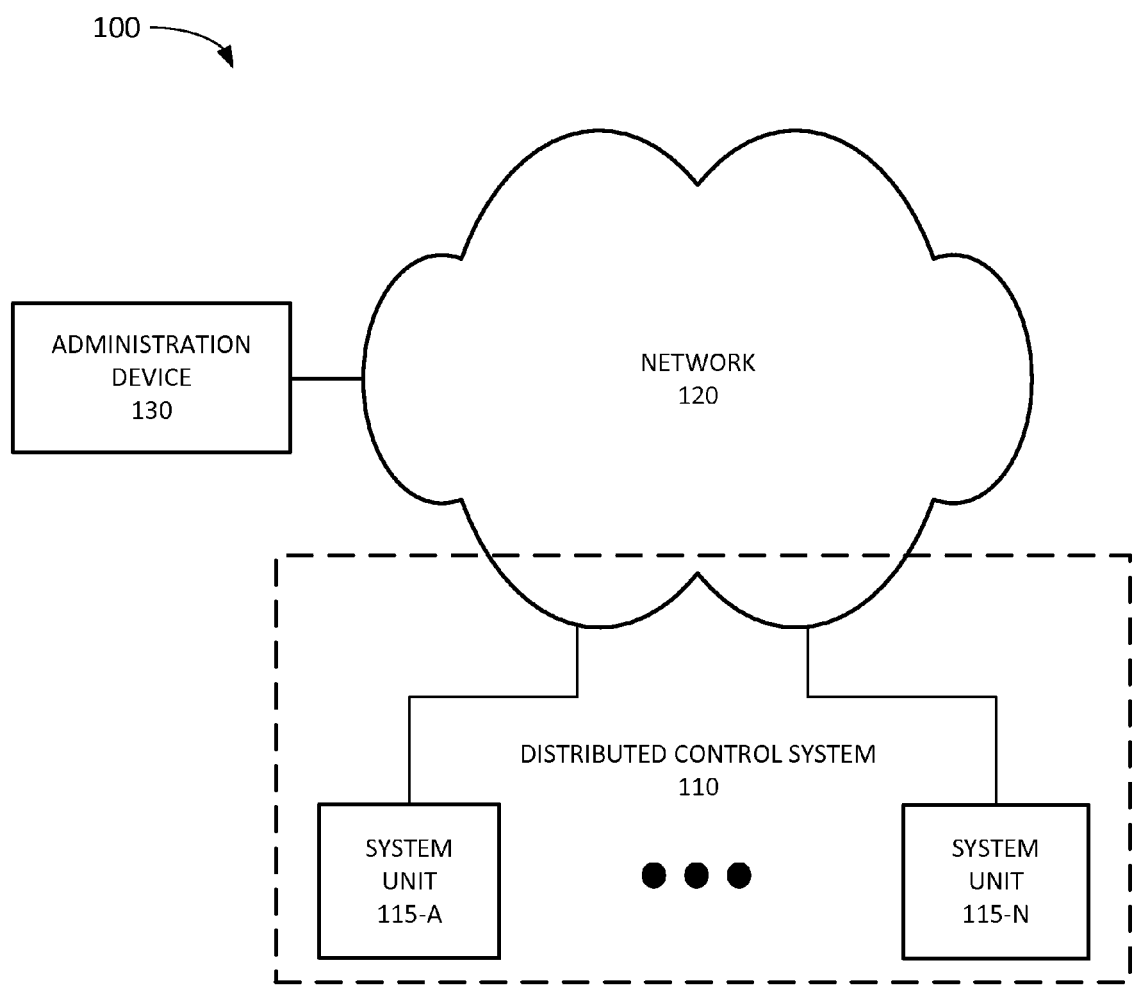
FIG. 1 is a block diagram illustrating an exemplary environment according to an embodiment described herein.

The following detailed description refers to the accompanying drawings. The same reference numbers in different drawings identify the same or similar elements.

A distributed control system may include a distributed physical access control system. A physical access control system may include one or more access control units with each access control unit controlling physical access to an area of a facility. For example, an access control unit may obtain credentials from a user and may unlock a door lock if the user's credentials are verified. In other implementations, a distributed control system may include a distributed building management system, a distributed monitoring system, a distributed security system, and/or another type of a distributed control system.

A distributed control system may perform distributed computing operations using a distributed algorithm. For example, a distributed control system may manage a distributed data base. A distributed algorithm may be consensus based. A consensus algorithm is used to achieve consensus among the nodes in a distributed system before an operation is performed. For example, in one embodiment, to update a distributed dataset, the nodes in the distributed system need to reach a consensus to perform the update. A consensus corresponds to nodes (e.g., all, a quorum, etc.) agreeing to a proposed operation (e.g., a change to a distributed database). A consensus may be reached if a quorum is obtained for a proposed operation. A quorum may be reached if a majority of the nodes votes for the proposed operation. Requiring a majority of nodes to vote for a change ensures that, for example, if two conflicting proposed changes are being considered, at least one node receives both of the proposed changes and selects and votes for the proposed change that was received first. In other implementations, the node may use a different criteria (other than which proposed change was received first) in selecting and voting for one of the proposed changes.

A distributed dataset may be used by a subset of nodes in a distributed system. For example, an application may use an application distributed dataset and the application may be installed on a subset of nodes in the distributed system. A subset of nodes that use a particular application dataset will be referred to herein as a dataset group. Implementations described herein may relate to managing distributed datasets associated with a particular application. A device in a distributed system may detect a request from an application to access an application dataset, corresponding to a distributed dataset associated with the application, and may determine whether the application dataset exists in the distributed system. If the application dataset does not exist, the application dataset may be created. If the application dataset does exist, a request to join a dataset group, which includes devices associated with the application dataset, may be sent to the other devices in the distributed system.

Another device in the distributed system may receive the request from the requesting device to be added to the dataset group and may generate a proposal to add the requesting device to the dataset group. Other devices in the dataset group, may vote for the proposal and if a consensus is reached, the requesting device may be added to the dataset group. The requesting device may then receive the application dataset, associated with the dataset group, and/or may propose to add application data and/or made other changes to the application dataset associated with the dataset group.

FIG. 1 is a block diagram of an exemplary environment 100 in which the systems and/or methods described below may be implemented. As shown in FIG. 1, environment 100 may include a distributed control system 110 (e.g., a distributed physical access control system), a network 120, and an administration device 130.

Distributed control system (DCS) 110 may include a distributed computing system that includes system units 115-A to 115-N (referred to collectively as "system units 115" and individually as "system unit 115"). System unit 115 may be implemented as an embedded system. In some implementations, system unit 115 may include a physical access control device. For example, system unit 115 may include an access controller that controls access to a secured area, such as a room or a group of rooms. System unit 115 may receive credentials (e.g., access card credentials) via a reader device and to determine whether the credentials are authentic and are associated with authority to access the secure area. If so, the access controller may issue a command to open a lock on a door or perform other operations associated with granting access to the secure area. In other implementations, system unit 115 may include a different type of security device, such as a monitoring device, a device that controls the operation of a machine, etc. In other implementations, system unit 115 may include another type of embedded system.

DCS 110 may include one or more distributed datasets. A distributed dataset includes a dataset associated with multiple devices. In one embodiment, the multiple devices communicate and coordinate with each other to make changes to the dataset. In some implementations, the distributed dataset is maintained by each device that is associated with the distributed data set, and, if a change is agreed upon by the devices, the change is applied to the distributed dataset by each of the devices. In other implementations, not all the devices associated with the distributed dataset store the actual distributed dataset.

In some embodiments, consensus is reached in order for a change to be made in the distributed dataset (e.g., a consensus-based distributed database). In other embodiments, a change may be made to the distributed dataset without consensus. A distributed dataset may be associated with all system units 115 or may be associated with a subset of system units 115. A system unit 115 may propose a change to a consensus-based distributed dataset. If the change is accepted by a quorum of system units 115 associated with the distributed dataset, a consensus may be reached and the change may be propagated to the distributed dataset in each associated system unit 115. Thus, a consensus with respect to a change in the distributed dataset may be reached if a quorum of the associated system units 115 votes for the change. A quorum may correspond to the smallest majority of the associated system units 115. Thus, if a distributed dataset is associated with N system units 115, a quorum may be reached if N/2+1 associated system units 115 votes for the change if N is an even number, or if (N−1)/2+1 associated system units 115 votes for the change if N is an odd number. Requiring a smallest majority to reach a quorum may ensure that when considering two conflicting proposals, at least one system unit 115 receives both proposals and selects one of the proposals for consensus. In some implementations, system unit 115 selects the first received proposal. In other implementations, a proposal may be selected using another criterion.

In some implementations, all system units 115 associated with a distributed dataset may store the distributed dataset. For example, a distributed dataset may include access rules and the access rules may be available to any system unit 115 associated with the distributed dataset. Thus, as a result of the one or more distributed datasets, in one embodiment, DCS 110 may correspond to a decentralized system with no central controlling device, such as a server device. In other embodiments, DCS 110 may include both a decentralized system and a central controlling device (such as a server device). In one embodiment, changes to a distributed dataset may be configured at any system unit 115 and propagated to other system units 115 associated with the distributed dataset. Furthermore, DCS 110 may exhibit robustness with respect to device failure, as a single point of failure may be avoided. For example, if a particular system unit 115 fails, the other system units 115 may continue to operate without loss of data (or with the minimization of loss of data). Moreover, DCS 110 may be changed dynamically. For example, applications may be added at any time and new datasets may be stored in system units 115 as needed. In other implementations, not all system units 115 associated with a distributed dataset store the distributed dataset.

DCS 110 may also include datasets that are not distributed. As an example, a first system unit 115 may include a local dataset that is not included in any other system unit 115. As another example, a first system unit 115 may include a local dataset that is replicated to a second system unit 115 in a non-distributed manner, such as by mirroring. As yet another example, a first system unit 115 may include a first version of a local dataset and a second system unit 115 may include a second version of the local dataset, wherein the first system unit 115 maintains the first version of the local dataset and the second system unit 115 maintains the second version of the local dataset. In yet another example, a first system unit 115 may derive a first local dataset from a distributed dataset and a second system unit 115 may derive a second local dataset from the distributed dataset, wherein the first local dataset is different from the second local dataset.

Network 120 may enable system units 115 to communicate with each other and/or may enable administration device 130 to communicate with particular system units 115. Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks.

Administration device 130 may enable an administrator to connect to a particular system unit 115 in order to configure DCS 110, change a configuration of DCS 110, receive information from DCS 110, and/or otherwise administer DCS 110. Administration device 130 may include any device configured for communicating with a system unit 115. For example, administration device 130 may include a portable communication device (e.g., a mobile phone, a smart phone, a phablet device, a global positioning system (GPS) device, and/or another type of wireless device); a personal computer or workstation; a server device; a laptop, tablet, or another type of portable computer; and/or any type of device with communication capability.

Although FIG. 1 shows exemplary components of environment 100, in other implementations, environment 100 may include fewer components, different components, differently arranged components, or additional components than depicted in FIG. 1. Additionally or alternatively, any one device in environment 100 (or any group of devices) may perform functions described as performed by one or more other devices in environment 100. For example, in some implementations, system units 115 may include an input and/or output device (e.g., keyboard/keypad and display, touchscreen, etc.) and administration device 130 may not be needed.

Figure 2:
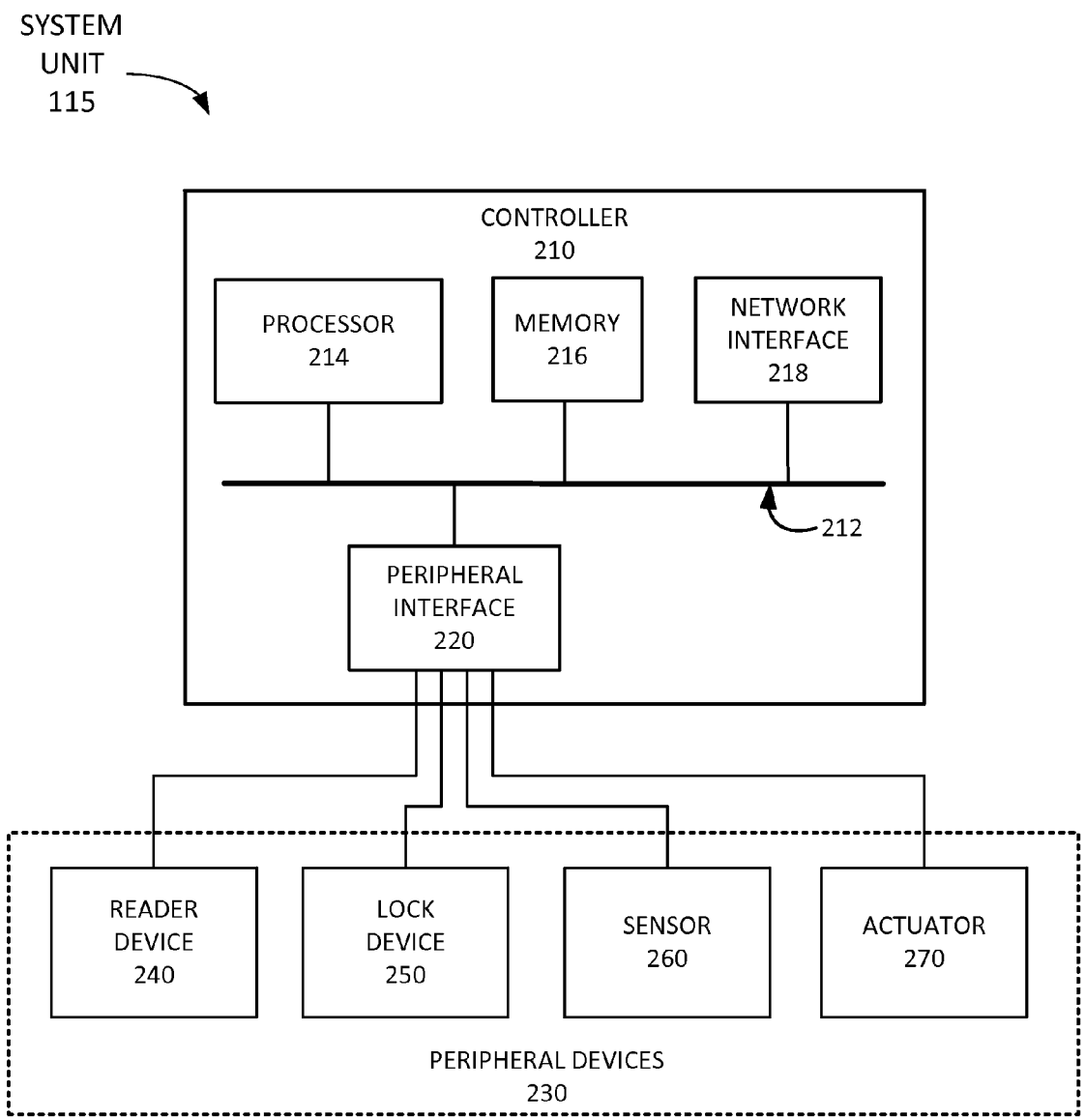
FIG. 2 is a block diagram illustrating exemplary components of a distributed system unit of FIG. 1.

FIG. 2 is a block diagram illustrating exemplary components of a system unit 115. As shown in FIG. 2, system unit 115 may include a controller 210 and one or more peripheral devices 230. Controller 210 may control the operation of system unit 115, may communicate with other system units 115, may communicate with administration device 130, and/or may control peripheral devices 230. Controller 210 may include a bus 212, a processor 214, a memory 216, a network interface 218, a peripheral interface 220, and a housing 222.

Bus 212 may include a path that permits communication among the components of controller 210. Processor 214 may include any type of single-core processor, multi-core processor, microprocessor, latch-based processor, and/or processing logic (or families of processors, microprocessors, and/or processing logics) that interprets and executes instructions. In other embodiments, processor 214 may include an application-specific integrated circuit (ASIC), a field-programmable gate array (FPGA), and/or another type of integrated circuit or processing logic.

Memory 216 may include any type of dynamic storage device that may store information and/or instructions, for execution by processor 214, and/or any type of non-volatile storage device that may store information for use by processor 214. For example, memory 216 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Network interface 218 may include a transceiver (e.g., a transmitter and/or a receiver) that enables controller 210 to communicate (e.g., transmit and/or receive data) with other devices and/or systems via wired communication links (e.g., conductive wire, twisted pair cable, coaxial cable, transmission line, fiber optic cable, and/or waveguide, etc.), wireless communication links (e.g., radiofrequency (RF), infrared, and/or visual optics, etc.), or a combination of wireless and wired communication links. Network interface 218 may include a transmitter that converts baseband signals to RF signals and/or a receiver that converts RF signals to baseband signals. Network interface 218 may be coupled to an antenna for transmitting and receiving RF signals.

Network interface 218 may include a logical component that includes input and/or output ports, input and/or output systems, and/or other input and output components that facilitate the transmission of data to other devices. For example, network interface 218 may include a network interface card (e.g., Ethernet card) for wired communications and/or a wireless network interface (e.g., a WiFi) card for wireless communications. Network interface 218 may also include a universal serial bus (USB) port for communications over a cable, a Bluetooth™ wireless interface, a radiofrequency identification (RFID) interface, a near-field communications (NFC) wireless interface, and/or any other type of interface that converts data from one form to another form.

Peripheral interface 220 may be configured to communicate with one or more peripheral devices 230. For example, peripheral interface 220 may include one or more logical components that include input and/or output ports, input and/or output systems, and/or other input and output components that facilitate the transmission of data to peripheral devices 230. As an example, peripheral interface 220 may communicate with peripheral devices using a Serial Peripheral Interface Bus protocol, such as a Wiegand protocol, an RS-485 protocol, and/or another type of protocol. As another example, peripheral interface 220 may use a different type of protocol. In one embodiment, network interface 218 may also act as a peripheral interface for coupling peripherals 230 to controller 210.

Housing 222 may enclose the components of controller 210 and may protect the components of controller 210 from the environment. In one embodiment, housing 222 may include one or more of peripheral devices 230. In another embodiment, housing 222 may include administration device 130. Housing 222 may define the boundaries of one system unit 115 and/or controller 210 from other system units 115 and/or controllers 210 in a system with multiple system units 115 and/or multiple controllers 210.

As described below, controller 210 may perform certain operations relating to managing application datasets and/or dataset groups in a distributed system. Controller 210 may perform these operations as a result of hardwired circuitry of an ASIC. Controller 210 may also (or alternatively) perform these operations in response to processor 214 executing software instructions contained in a computer-readable medium, such as memory 216. A computer-readable medium may include a non-transitory memory device. A memory device may be implemented within a single physical memory device or spread across multiple physical memory devices. The software instructions may be read into memory 216 from another computer-readable medium or from another device. The software instructions contained in memory 216 may cause processor 214 to perform processes described herein. Thus, implementations described herein are not limited to any specific combination of hardware circuitry and software.

Peripheral devices 230 may include one or more devices that provide information to controller 210, that are controlled by controller 210, and/or that otherwise communicate with controller 210. For example, peripheral devices 230 may include a reader device 240, a lock device 250, a sensor 260, and/or an actuator 270. While a single reader device 240, a single lock device 250, a single sensor 260, and a single actuator 270 are shown in FIG. 2 for illustrative purposes, in practice, peripheral devices 230 may include multiple reader devices 240, multiple lock devices 250, multiple sensors 260, and/or multiple actuators 270. In some implementations, peripheral devices 230 may not include one or more of the devices shown in FIG. 2. Additionally or alternatively, peripheral devices 230 may include any other type of security device not shown in FIG. 2.

Reader device 240 may include a device that reads credentials from a user and provides the credentials to controller 210. For example, reader device 240 may include a keypad configured to receive an alphanumeric personal identification number (PIN) from a user; a card reader to configure a card that stores a card code on a magnetic strip or another type of storage device, such as a RFID tag; a fingerprint reader configured to read a user's fingerprint; an iris reader configured to read a user's iris; a microphone and a voice signature identifier configured to record a user's voice signature; a near field communication (NFC) reader; and/or another type of reader device. Reader device 240 may include any type security device that can provide credentials, and may include one or more sensor devices, such any sensor device described below with reference to sensor 260. For example, reader device 240 may include a camera used for facial recognition and/or a microphone used for voice recognition.

Lock device 250 may include a lock controlled by controller 210. Lock device 250 may lock a door (e.g., prevent it from opening or closing), a window, an HVAC vent, and/or another type of access opening to a secure area. For example, lock device 250 may include an electromagnetic lock; a mechanical lock with a motor controlled by controller 210; an electromechanical lock; and/or another type of lock. Furthermore, lock device 250 may lock/unlock operation of a machine, transport vehicle, elevator, and/or an electrical device.

Sensor 260 may include a sensor device. As examples, sensor 260 may include a door sensor to sense whether a door is open or closed; a visible light monitoring camera, an infrared (IR) light monitoring camera, a heat signature monitoring camera, and/or another type of monitoring device; an alarm sensor, such as a motion sensor, a heat sensor, a pressure sensor, and/or another type of alarm sensor; an audio recording device (e.g., microphone); a tamper sensor, such as a position sensor located inside system unit 115; and/or a "request to exit" button located within a secured area associated with system unit 115; and/or another type of sensor device.

Actuator 270 may include an actuator device. As an example, actuator 270 may control an illumination device. As other examples, actuator 270 may include a burglar alarm activator; a speaker to play messages or generate alarm signals; a display device; a motor to move sensor 260 (e.g., control the field of view of a camera or other monitoring device); a motor for opening/closing a door, window, HVAC vent, and/or another opening associated with a secure area; a motor to secure lock device 250 in a locked or unlocked position; a fire extinguishing device; and/or another type of actuator device.

Although FIG. 2 shows exemplary components of system unit 115, in other implementations, system unit 115 may include fewer components, different components, additional components, or differently arranged components than depicted in FIG. 2. Additionally or alternatively, any component of system unit 115 (or any group of components) may perform the task or tasks described as performed by one or more other components of system unit 115. For example, in some implementations, peripheral interface 220 may correspond to a network interface. As another example, in some implementations, peripheral devices 230 may be connected to controller 210 via network interface 218, rather than via peripheral interface 220.

Further, although DCS 110 may include a physical access distributed control system, other implementations may control systems other than physical access systems. On the other hand, DCS 110 may include any type of physical access control systems (e.g., in an operational environment), such as a control system for opening and/or closing a door or controlling physical access to a building or facility. DCS 110 may also include a system to control a fan (e.g., start or stop), to initiate an alarm in a building management system (e.g., failed authentication, successful authentication, etc.), or to control a robot arm in an industrial automation system.

Figure 3A:
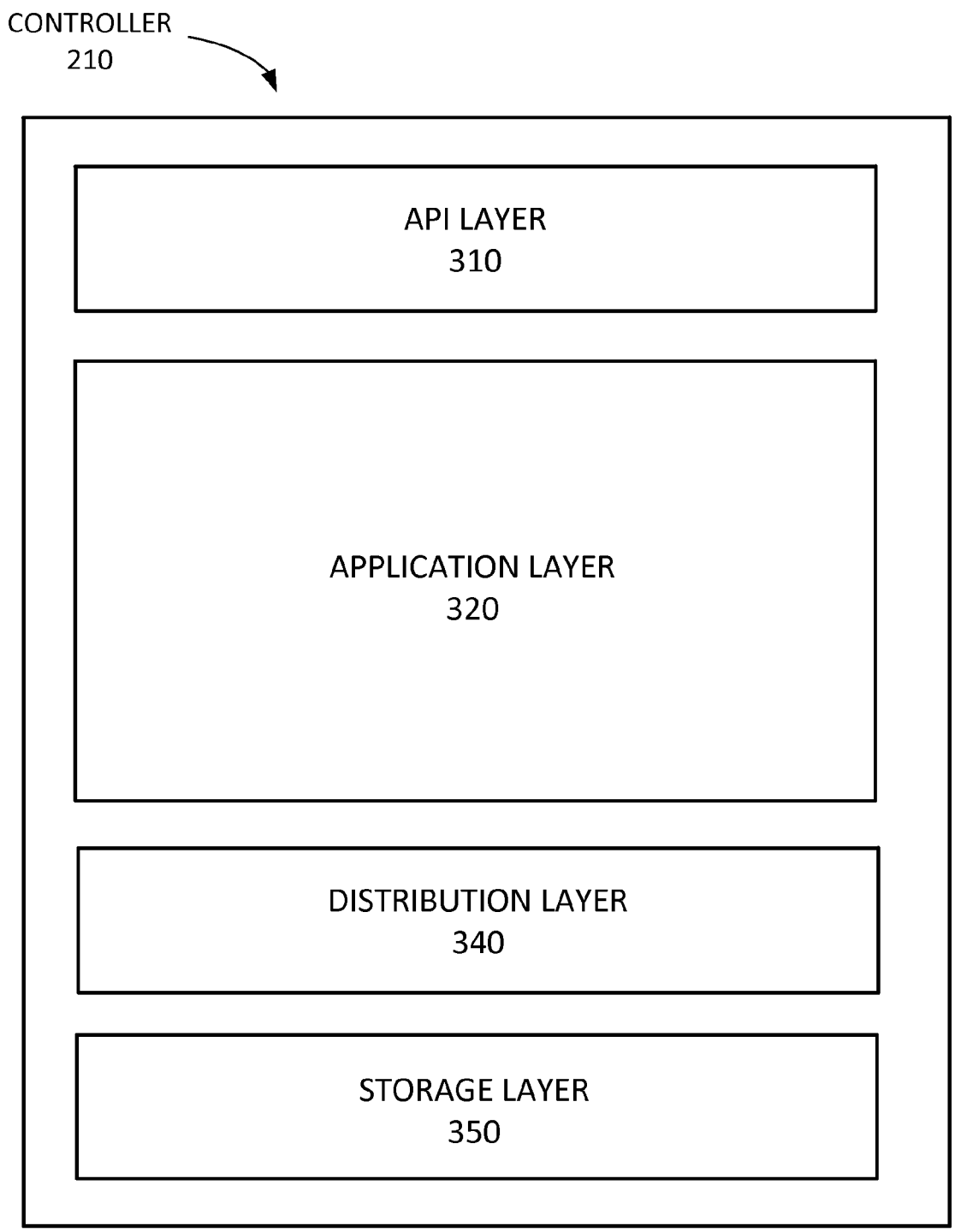
FIGS. 3A and 3B are block diagrams illustrating exemplary functional components of the distributed system unit of FIG. 1.
Figure 3B:
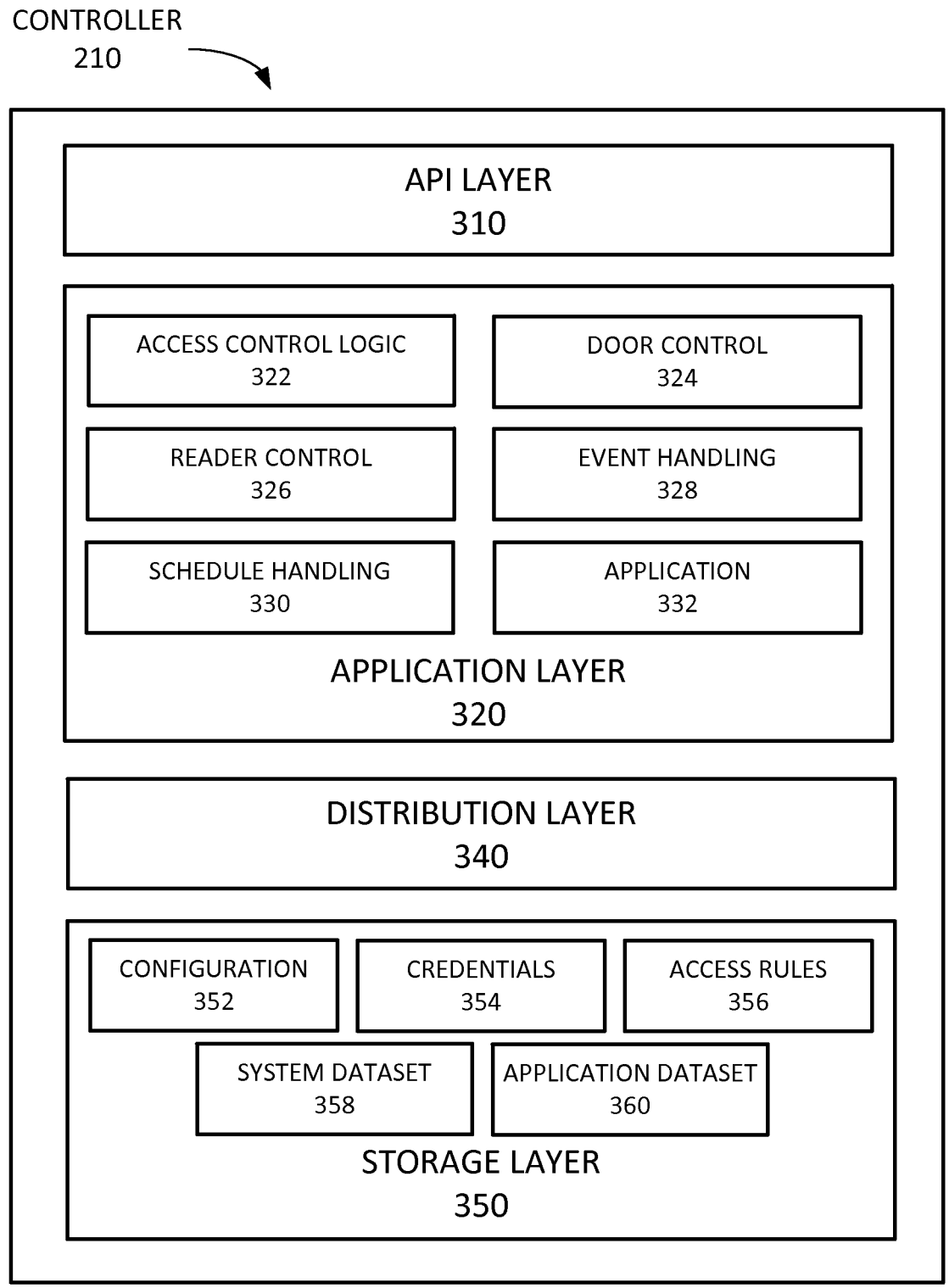

FIGS. 3A and 3B are block diagrams illustrating exemplary functional components of system unit 115. The functional components of system unit 115 may be implemented, for example, via hard-wired circuitry of one or more ASICs. Additionally or alternatively, the functional components of system unit 115 may be implemented by processor 214 executing instructions from memory 216. FIG. 3A illustrates the functional layers of system unit 115. As shown in FIG. 3A, system unit 115 may include an application programming interface (API) layer 310, an application layer 320, a distribution layer 340, and a storage layer 350.

API layer 310 includes an API configured to communicate, e.g., with administration device 130. As an example, when an administrator uses administrator device 130 to log into system unit 115, API layer 310 may communicate with administrator device 130 to authenticate the administrator. As another example, API layer 310 may communicate with administrator device 130 to change a configuration of system unit 115. API layer 310 may receive data from administrator device 130 and provide the data to distribution layer 340 and/or to storage layer 350. API layer 310 may also communicate with administrator device 130 to install an application in application layer 320. API layer 310 may be configured to handle different administrator types. For example, API layer 310 may include an API to handle a Web Services administrator, a Linux administrator, an Open Network Video Interface Forum (ONVIF) administrator, and/or another type of API.

Application layer 320 includes one or more applications installed on system unit 115. FIG. 3B shows exemplary applications. As shown in FIG. 3B, application layer 320 may include an access control logic application 322, a door control application 324, a reader control application 326, an event handling application 328, a schedule handling application 330, and/or an application 332.

Access control logic application 322 may determine whether to grant access based on received credentials and based on stored access rules. Door control application 324 may control one or more doors and/or associated lock devices 250. For example, door control application 324 may determine whether a door is open or closed and/or locked or unlocked and may operate one or more device to open or close the door and/or to lock or unlock the door. Reader control application 326 may control one or more reader devices 240 and may obtain and process credentials received from the one or more reader devices 240. Event handling application 328 may maintain a log of events recorded or generated by system unit 115 and/or recorded by another system unit 115. Event handling application 328 may ensure that locally recorded or generated events are distributed to other system units 115 in DCS 110 in order to maintain a distributed system event log in all (or at least some) system units 115. Thus, logged events may be retrieved from any system unit 115 that is associated with the system event log. Schedule handling application 330 may manage one or more schedules associated with system unit 115. For example, access rules for particular groups of users may change based on particular times of day.

Application 332 may correspond to a particular application, installed in application layer 320 of system unit 115, which uses a distributed dataset. For example, application 332 may correspond to an application associated with a particular sensor 260, such as a camera controlling application; a application associated with a particular actuator 270, such as a door motor application; an application that performs information processing, such as a people counting application; an API application, such as application that provides a platform for third party application to control a peripheral device 230; an application configured to communicate with a remote device across a network; and/or another type of application.

Other applications (not shown in FIG. 3B) may be included in application layer 320. As an example, an alarm application may generate a report and/or an alarm and send the report and/or alarm to administrator device 130 (and/or to another designated device) and/or one or more other system units 115. As another example, a task-specific control application may process events associated with system unit 115, such as door opening events, sensor events, actuator events, and/or other types of events.

Distribution layer 340 may manage one or more distributed datasets associated with system unit 115. For example, distribution layer 340 may maintain secure connections with other system units 115 over network 120. (e.g., a Transport Layer Security (TLS) connection). Furthermore, distribution layer 340 may use a protocol (e.g., a PAXOS protocol) to establish a consensus with respect to a change in a particular consensus-based distributed dataset. As an example, distribution layer 340 may send a proposal for a change to other system units 115 associated with the distributed dataset and may receive a quorum for the change from the other system units 115. As another example, distribution layer 340 may vote for a proposal received from another system unit 115. As yet another example, distribution layer 340 may receive an indication that a consensus has been reached for a change without having voted for the change. When an indication of consensus for a change is received, distribution layer 340 may apply the change to the distributed dataset in storage layer 350. Distribution layer 340 may receive a request from application 332 to access an application dataset, may check a system dataset to determine whether the application dataset exists. If the application dataset exists, distribution layer 340 may request to join a dataset group of devices, associated with the application dataset, by sending a request to other system units 115 in DCS 110. If the application dataset does not exist, distribution layer 340 may create the application dataset on behalf of application 332.

Storage layer 350 may store one or more datasets associated with system unit 115. A dataset stored in storage layer 350 may correspond to a local dataset or may correspond to a distributed dataset. A local dataset may store information associated with (and/or only associated with) the particular system unit 115 that stores the local dataset. A distributed dataset may store information associated with other system units 115 associated with the distributed dataset.

Exemplary information that may be included in storage layer 350 is shown in FIG. 3B. As shown in FIG. 3B, storage layer 350 may include configuration data 352, credentials data 354, access rules data 356, a system dataset 358, and an application dataset 360. Configuration data 352 may store configuration data associated with a particular system unit 115, such as hardware configuration of controller 210, peripheral devices 230 connected to controller 210, application installed in application layer 320, and/or other types of configuration information. Credentials data 354 may store credentials associated with system unit 115. Access rules 356 may store access rules associated with system unit 115.

System dataset 358 may correspond to a distributed dataset that is associated with system units 115 (e.g., all system units 115) in DCS 110. Thus, system dataset 358 may be stored in each system unit 115 in DCS 110. Exemplary information that may be stored in system dataset 358 is described below with reference to FIG. 4A.

Application dataset 360 may correspond to a distributed dataset associated with a particular application, such as application 332. Exemplary information that may be stored in application dataset 360 is described below with reference to FIG. 4B.

Although FIGS. 3A and 3B show exemplary functional components of system unit 115, in other implementations, system unit 115 may include fewer functional components, different functional components, differently arranged functional components, or additional functional components than depicted in FIGS. 3A and 3B. For example, while a single application 332 and a single application dataset 360 are shown in FIG. 3B for illustrative purposes, in practice, application layer 320 may include multiple applications 332 and storage layer 350 may include multiple application datasets 360. Additionally, any one of the components (or any group of components) of system unit 115 may perform functions described as performed by one or more other functional components of system unit 115.

FIG. 4A is a diagram of exemplary information that may be stored in system dataset 358. As shown in FIG. 4A, system dataset 358 may include a system unit list 410 and one or more distributed dataset identifier (ID) field 420. System unit list 410 may store a list of system units 115 included in DCS 110.

Distributed dataset ID fields 420 may store information identifying distributed datasets that exist in DCS 110. Distributed datasets field 420 may include one or more distributed dataset entries. Each distributed dataset ID field 420 may include one or more IDs associated with a particular distributed dataset in DCS 110. The one or more IDs may include a name of a dataset group; a ID, name, and/or description of an application associated with the distributed dataset; metadata describing content of the dataset; and/or any other information that may be used to identify a particular distributed dataset. The distributed dataset IDs may be used by distribution layer 340 to identify a particular application dataset when application 332 requests access to an application dataset.

Although FIG. 4A show exemplary components that may be stored in system dataset 358, in other implementations, system dataset 358 may include fewer components, different components, differently arranged components, or additional components than depicted in FIG. 4A.

FIG. 4B is a diagram of exemplary information that may be stored in application dataset 360. As shown in FIG. 4B, application dataset 360 may include a distributed dataset ID field 430, one or more system unit fields 440-A to 440-N, a quorum field 450, and an application data field 460. Distributed dataset ID 430 may identify a particular application dataset 360 and may correspond to a distributed dataset ID stored in distributed dataset ID field 420 of system dataset 358.

System unit fields 440 may store information identifying system units 115 in the dataset group associated with application dataset 360. Quorum field 450 may store information identifying the number of votes required from system units 115 in the dataset group, when voting for a proposed change to application dataset 360, in order to reach consensus. Application data field 460 may store application data associated with application dataset 360.

Although FIG. 4B show exemplary components that may be stored in application dataset 360, in other implementations, application dataset 360 may include fewer functional components, different functional components, differently arranged functional components, or additional functional components than depicted in FIG. 4B.

Figure 5:
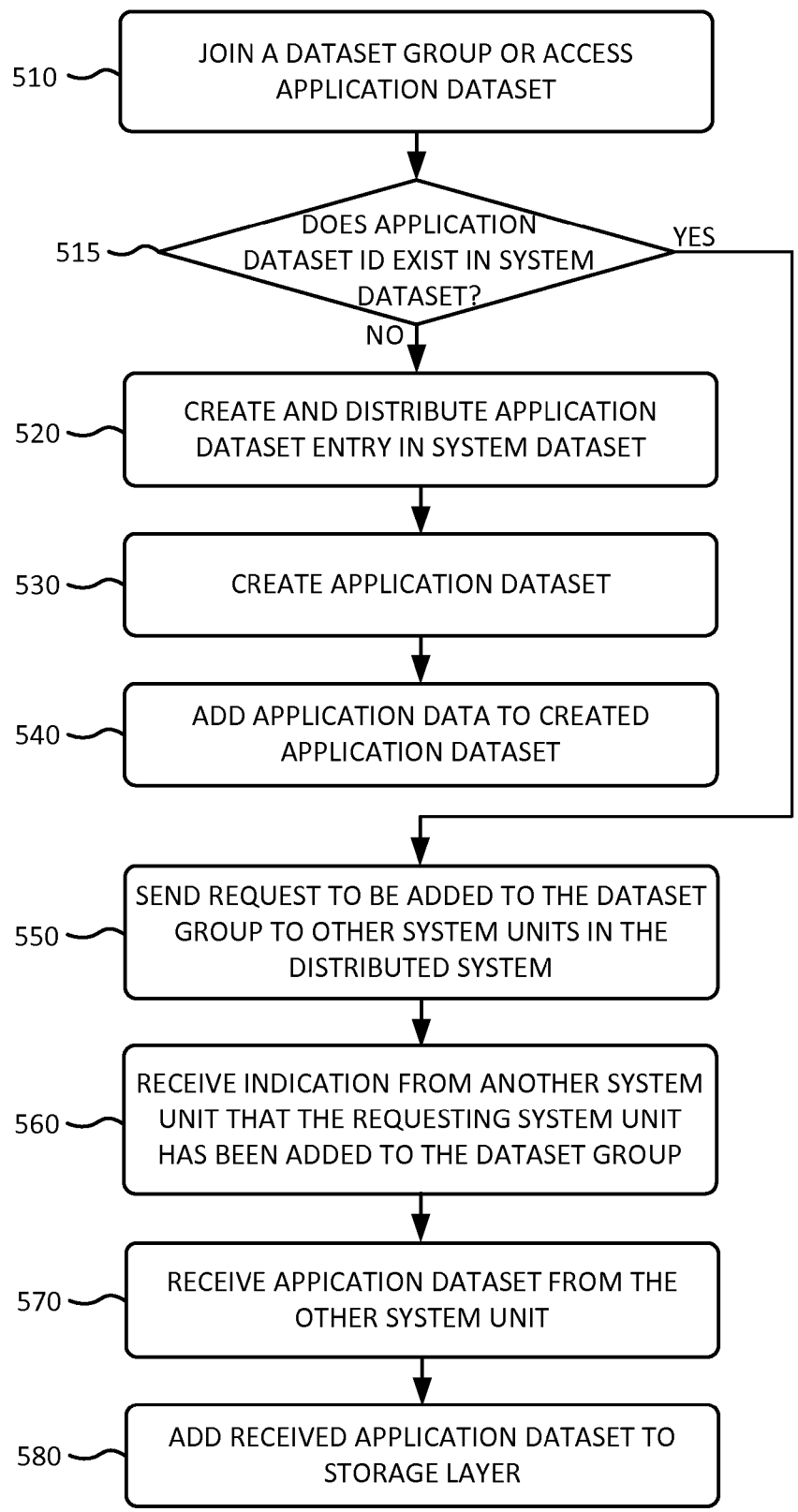
FIG. 5 is flowchart for joining a dataset group or accessing an application dataset in a distributed control system according to one or more implementations described herein.

FIG. 5 is flowchart for joining a dataset group or accessing an application dataset in a distributed control system according to one or more implementations described herein. In some implementations, the process of FIG. 5 may be performed by controller 210. In other implementations, some or all of the process of FIG. 5 may be performed by another device or a group of devices separate from controller 210 and/or including controller 210.

The process of FIG. 5 may include joining a dataset group or accessing an application dataset (block 510). For example, an administrator may use administration device 130 to log into a particular system unit 115 and may install application 332 on the particular system unit 115. Application 332 may be configured to store data to a distributed dataset and/or to retrieve data from a distributed dataset. Thus, after application 332 is installed, application 332 may send a request to distribution layer 340 to access a distributed dataset associated with application 332. A determination may be made as to whether an application dataset ID exists in a system dataset (block 515). As explained previously, system dataset 358 includes distributed dataset ID field 420, which store IDs of the distributed datasets included in DCS 110. Distribution layer 340 may access distributed dataset IDs fields 420 to determine whether a ID for application 332 is listed in distributed dataset IDs field 420.

If it is determined that an application dataset ID does not exists in the system dataset (block 515—NO), an application dataset entry may be created and distributed in the system dataset (block 520). Since system dataset 358 is a distributed dataset within DCS 110, in order to make changes to system dataset 358, system unit 115 obtains consensus to make a change in distributed dataset ID fields 420 of system dataset 358. Controller 210 of system unit 115 may send a proposal for the change to other system units 115 in DCS 110 and when a quorum, with respect to system dataset 358, of votes is received from the other system units 115, the application dataset entry may be added to distributed dataset ID fields 420 of system dataset 358.

The application dataset may be created (block 530) and application data may be added to the application dataset (block 540). For example, distribution layer 340 may create application dataset 360 in storage layer 350, may receive application data from application 332, and may add the received application data to application dataset 360. Furthermore, distribution layer 340 may set the quorum requirement for the dataset group associated with application dataset 360 to 1, since the particular system unit 115 that created the application dataset entry in distributed dataset IDs fields 420 of system dataset 358 is the first system unit 115 associated with the application dataset and no other system units 115 belong to the dataset group associated with the application dataset. Thus, to add application data to application dataset 360, votes from other system units 115 do not need to be obtained.

Returning to block 515, if it is determined that an application dataset ID does exists in the system dataset (block 515—YES), a request may be sent to other system units 115 in DCS 110 to request to be added to the dataset group associated with the application dataset (block 550). Since distributed dataset IDs fields 420 may not include information listing which system units 115 are associated with particular distributed datasets, controller 210 may need to send the request to be added to the dataset group to the other system units 115 (e.g., all other system units 115) in DCS 110.

An indication may be received from another system unit that the requesting system unit has been added to the distributed dataset (block 560). For example, one or more of the other system units 115 in DCS 110, which are in the dataset group associated with the application dataset, may process the request and add the requesting system unit 115 to the dataset group. A process of adding a system unit 115 to an existing dataset group is described below with reference to FIG. 7. Once the requesting system unit 115 is added to the dataset group, the particular system unit 115 that added the requesting system unit 115 may send an indication to the requesting system unit 115.

In response to receiving the indication of being added to the dataset group, the application dataset may be received from the other system unit (block 570), and the received application dataset may be added to the storage layer (block 580). For example, distribution layer 340 may receive the application dataset from the other system unit 115 and may store the received application dataset in storage layer 350. The application dataset may include a list of system units 115 which are associated with the dataset group and the quorum requirement for performing operations on the application dataset.

Figure 6:
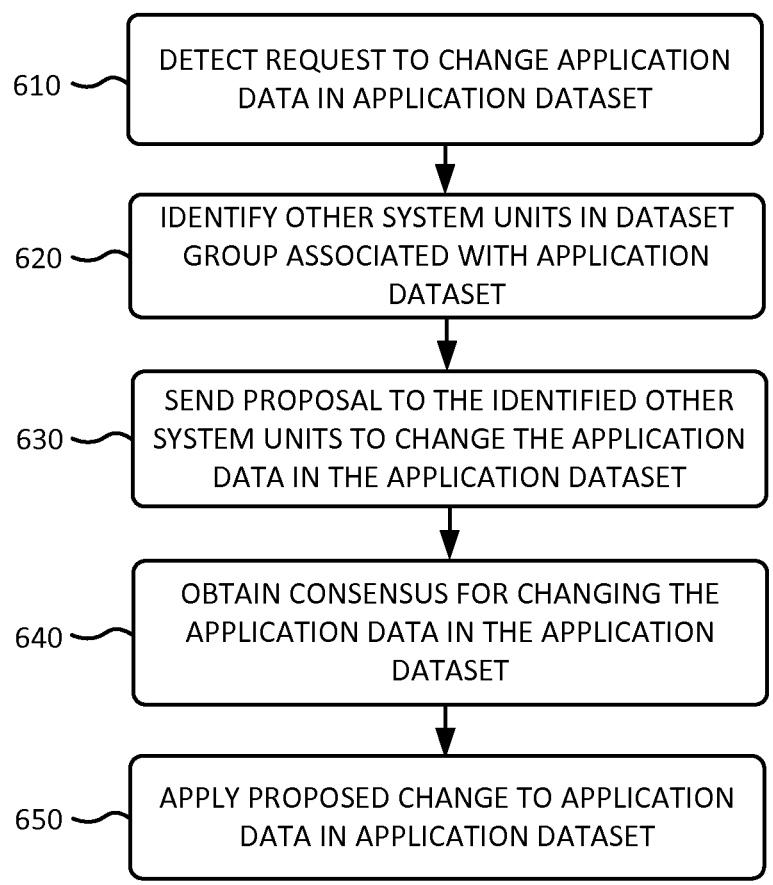
FIG. 6 is a flowchart for adding application data to an application dataset in a distributed control system according to one or more implementations described herein.

FIG. 6 is a flowchart for changing application data in an existing application dataset in a distributed control system according to one or more implementations described herein. In some implementations, the process of FIG. 6 may be performed by controller 210. In other implementations, some or all of the process of FIG. 6 may be performed by another device or a group of devices separate from controller 210 and/or including controller 210.

The process of FIG. 6 may include detecting a request to change application data in an application dataset (block 610). As an example, application 332 may generate application data, such as receiving data from a particular peripheral device 230, recording an instruction sent to a particular peripheral device 230, recording the result of a calculation, and/or another type application data generated by application 332. As another example, application 332 may select to modify, update, delete, and/or otherwise change existing application data in application dataset 360. Application 332 may provide the application data change to distribution layer 340.

Other system units in the dataset group associated with the application dataset may be identified (block 620) and a proposal may be sent to the other identified system units to change the application data in the application dataset (block 630). For example, distribution layer 340 may access application dataset 360, may determine system units 115 identified in system unit fields 440, and may send a proposal for the application data change to the system units 115 identified in system unit fields 440.

Consensus may be obtained for changing the application data in the application dataset (block 640) and the proposed change may be applied in the application dataset (block 650) in response to the obtained consensus. System unit 115 may receive a quorum of votes to accept the proposed change. For example, if ten (10) system units 115 are associated with the dataset group, the requesting system unit 115 may need to receive votes from six (6) of the associated system units 115 in order to change the application data in application dataset 360. Once six (6) votes are received, consensus has been reached for the proposed change and the proposed change may take place. Distribution layer 340 may perform the adding, changing, updating, deleting, and/or otherwise changing of the application data in application dataset 360 in storage layer 350, in response to obtaining consensus for the proposed change.

Figure 7:
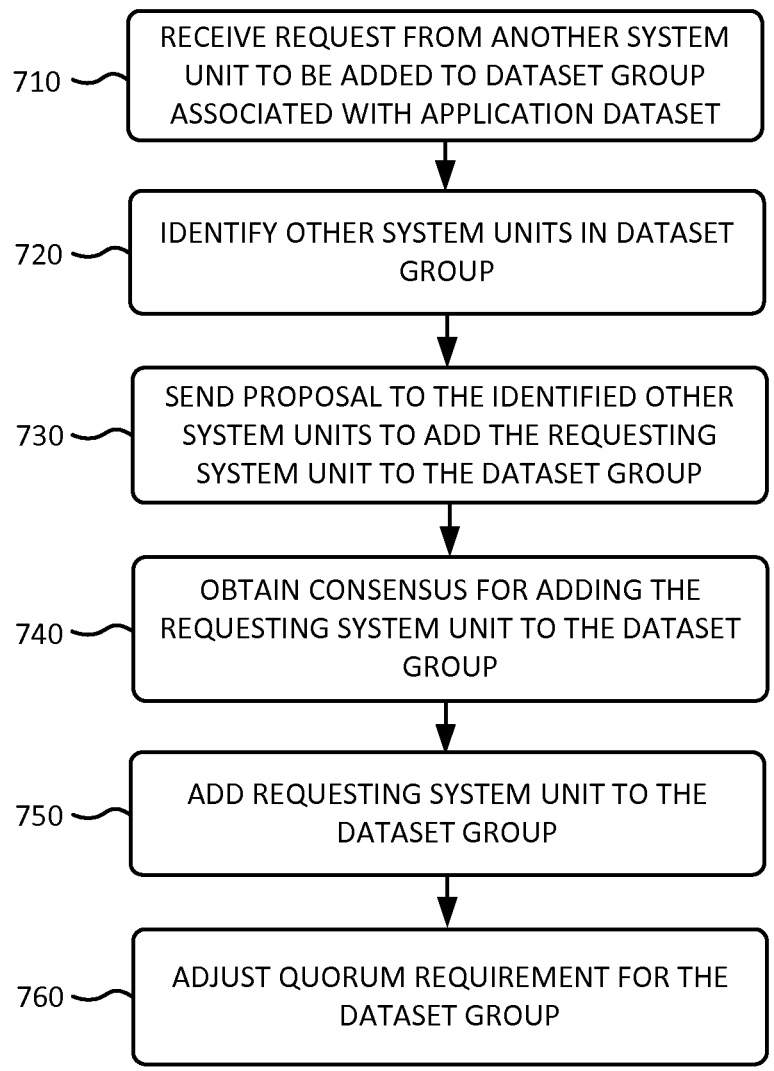
FIG. 7 is a flowchart for processing a request to add a system unit to a dataset group associated with an application dataset in a distributed control system according to one or more implementations described herein.

FIG. 7 is a flowchart for processing a request to add a system unit to a dataset group, associated with an application dataset, in a distributed control system according to one or more implementations described herein. In some implementations, the process of FIG. 7 may be performed by controller 210. In other implementations, some or all of the process of FIG. 7 may be performed by another device or a group of devices separate from controller 210 and/or including controller 210.

The process of FIG. 7 may include receiving a request from another system unit to be added to a dataset group associated with an application dataset (block 710). For example, controller 210 of system unit 115 may receive a request from a requesting system unit to be added to a dataset group associated with a particular application dataset. System unit 115 may receive the request and may determine that the request is relevant if system unit 115 is associated with the dataset group. For example, system unit 115 may determine whether application dataset 360, associated with application 332 identified in the request, exists in storage layer 350.

Other system units in the dataset group may be identified (block 720) and a proposal may be sent to the other identified system units to add the requesting system unit to the dataset group (block 730). For example, distribution layer 340 may access application dataset 360, may determine system units 115 identified in system unit fields 440, and may send a proposal to add the requesting system unit 115 to the system units 115 identified in system unit fields 440 of application dataset 360.

Consensus may be obtained for adding the requesting system unit to the dataset group (block 740) and the requesting system unit may be added to the dataset group (block 750) in response to the obtained consensus. Furthermore, the quorum requirement for the dataset group may be adjusted (block 760). System unit 115 may receive a quorum of votes to accept the proposed change to add the requesting system unit 115. For example, if 10 system units 115 are in the dataset group, the proposing system unit 115 may need to receive votes from six (6) of the associated system units 115 in order to add the requesting system unit 115 to the dataset group. Once six (6) votes are received, consensus has been reached for the proposed addition and the requesting system unit 115 may be added to the dataset group associated with application dataset 360. For example, distribution layer 340 may generate a system unit field 440 for the requesting system unit 115 in application dataset 360. Furthermore, distribution layer 340 may adjust the quorum requirement in quorum field 450 of application dataset 360. For example, if ten (10) system units 110 were associated with the dataset group and now eleven (11) system units 115 are associated with the dataset group, the quorum requirement of six (6) may not change. However, if another system unit 115 is added to the dataset group to a total of twelve (12) system units, the quorum requirement may change from six (6) to seven (7).

In some implementations, a removal process may be performed if a particular system unit 115 requests to be removed from a dataset group associated with an application dataset. For example, application 332 may be uninstalled from a particular system unit 115. As part of the uninstallation process, application 332 may request that the particular system unit 115 be removed from application dataset 360. Thus, the particular system unit 115 may send a proposal to the other system units 115 in the dataset group associated with application dataset 360, to be removed. If a consensus is obtained for the proposal, the particular system unit 115 may be removed from the dataset group and application dataset 360 may be deleted from storage layer 350.

In some implementations, installation of application 332 may be automated. Thus, rather than an administrator using administration device 130 to install application 332 on each system unit 115 one at a time, application 332 may be installed on one system unit 115 and a set of installation instructions may be installed on system unit 115. The installation instructions may be included as part of application 332 or as a separate program, application, and/or script file. The installation instructions may include one or more criteria for installing application 332 and instructions to install application 332 may be sent to other system units 115 in DCS 110 if a particular system unit 115 meets one or more criteria. Thus, if the one or more criteria are met by a particular system unit 115, the particular system unit 115 may install application 332. After application 332 is installed by the particular system unit 115, the particular system unit 115 may perform the process of FIG. 5 to be added to the dataset group associated with application dataset 360, associated with application 332. The one or more criteria for installing application 332 on the particular system unit 115 may include a hardware configuration associated with the particular system unit 115; a particular type of peripheral device connected to the particular system unit 115; a location type associated with the particular system unit 115; an event type logged by the particular system unit 115; a particular application installed on the particular system unit 115; and/or other types of criteria.

Figure 8:
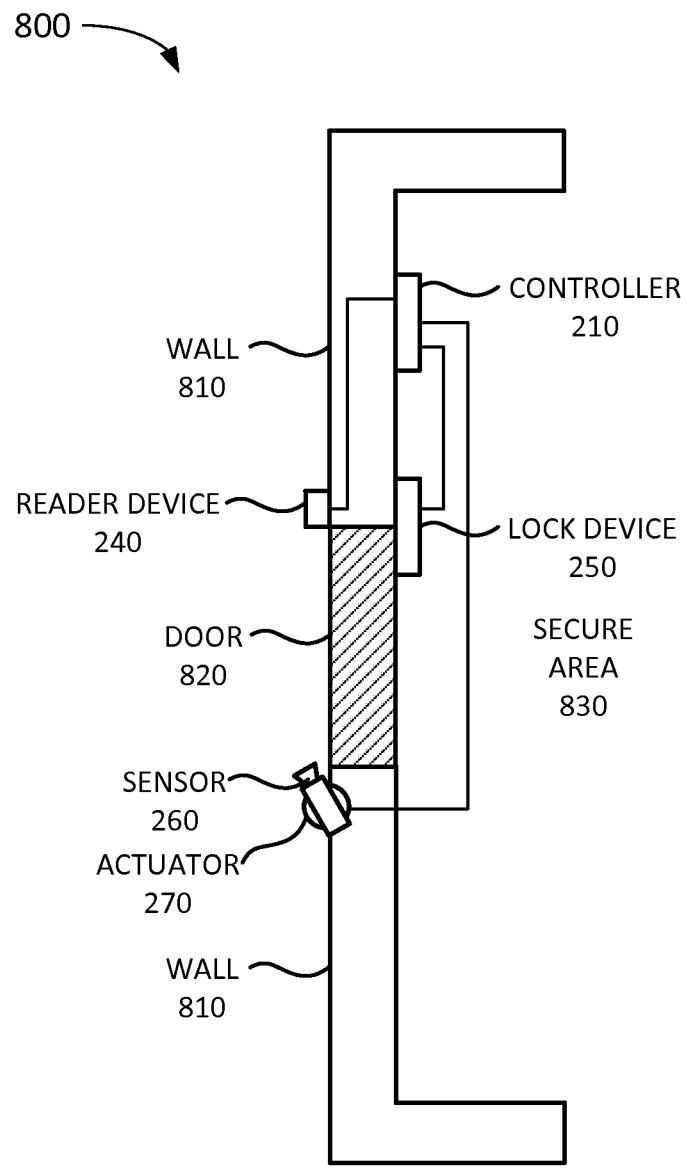
FIG. 8 is a floor plan diagram illustrating an exemplary physical layout of the distributed system unit of FIG. 1.

FIG. 8 is a floor plan diagram illustrating an exemplary physical layout 500 of system unit 115. As shown in FIG. 8, physical layout 800 may include a wall 810, a door 820, controller 210, reader device 240, lock device 250, sensor 260, and actuator 270.

Wall 810 encloses a secure area 830, such as a room in a building. Door 820 provides access for a user to secure area 830. In this embodiment, controller 210 is installed inside secure area 830. In other embodiments, controller 210 may be installed outside secure area 830. Reader device 240 is installed outside secure area 830 and lock device 250 is installed inside secure area 830 to wall 810 and door 820. Sensor 260, in this example, is a monitoring device mounted outside secure area 830. Actuator 270 includes a motor used to control the field of view of the monitoring device in this example.

When a user enters credentials into reader device 240 (e.g., by entering a PIN, scanning an access card, scanning an iris, etc.), controller 210 may use the credentials to authenticate the identity of the user and may perform a lookup in an access rules table to determine whether to grant access to the user based on the identity of the user and the access rules. If controller 210 determines that access should be granted, controller 210 activates lock device 250 to unlock door 820, thus granting access to the user to secure area 840.

Although FIG. 8 shows exemplary components of physical layout 800, in other implementations, physical layout 800 may include fewer components, different components, additional components, or differently arranged components than depicted in FIG. 8. Additionally or alternatively, any one component (or group of components) in physical layout 800 may perform a task or tasks described as performed by one or more other components of physical layout 800.

Figure 9:
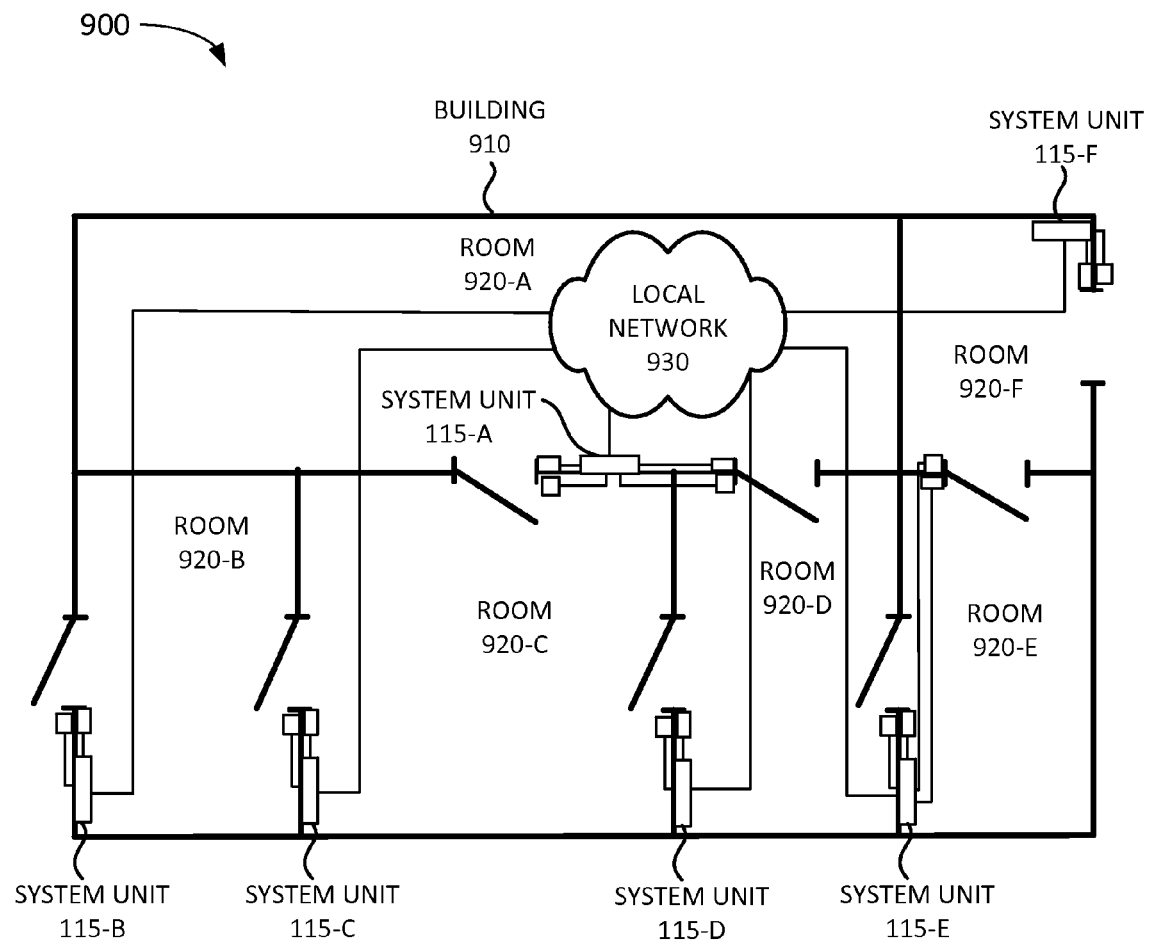
FIG. 9 is a floor plan diagram illustrating an exemplary physical layout of the distributed system of FIG. 1.

FIG. 9 is a floor plan diagram illustrating an exemplary physical layout 900 of DCS 110. As shown in FIG. 9, physical layout 900 may include a building 910 with rooms 920-A through 920-F. A local network 930, such as an Ethernet network, may interconnect system units 115-A through 115-F. In this example, system unit 115-A controls two doors into room 920-A; system unit 115-B controls an outside door into room 920-B; system unit 115-C controls one door from room 920-B to room 920-C, system unit 115-D controls one door from room 920-C to room 920-D; system unit 115-E controls one door from room 920-D to room 920-E; and system unit 115-F controls an outside door into room 920-F.

In this example, system units 115-A to 115-F do not include a central controlling device (e.g., a server) and may include one or more distributed datasets. For example, system units 115-A through 115-F may maintain a distributed credentials table, a distributed access rules table, and/or a distributed events log. Assume an administrator uses administration device 130 to log into system unit 115-A to add a user and to add credentials associated with a user. Those added credentials may be distributed to the other system units 115 that control doors to rooms to which the user has access. If system unit 115-B fails, for example, data collected by system unit 115-B may continue to be available as a result of a distributed events log included in the other system units.

Although FIG. 9 shows exemplary components of physical layout 900, in other implementations, physical layout 900 may include fewer components, different components, additional components, or differently arranged components than depicted in FIG. 9. For example, in another embodiment, a central controlling device (e.g., a server) may be used in conjunction with one or more distributed datasets. Additionally or alternatively, one or more components of physical layout 900 may perform one or more tasks described as performed by one or more other components of physical layout 900.

Figure 10A:
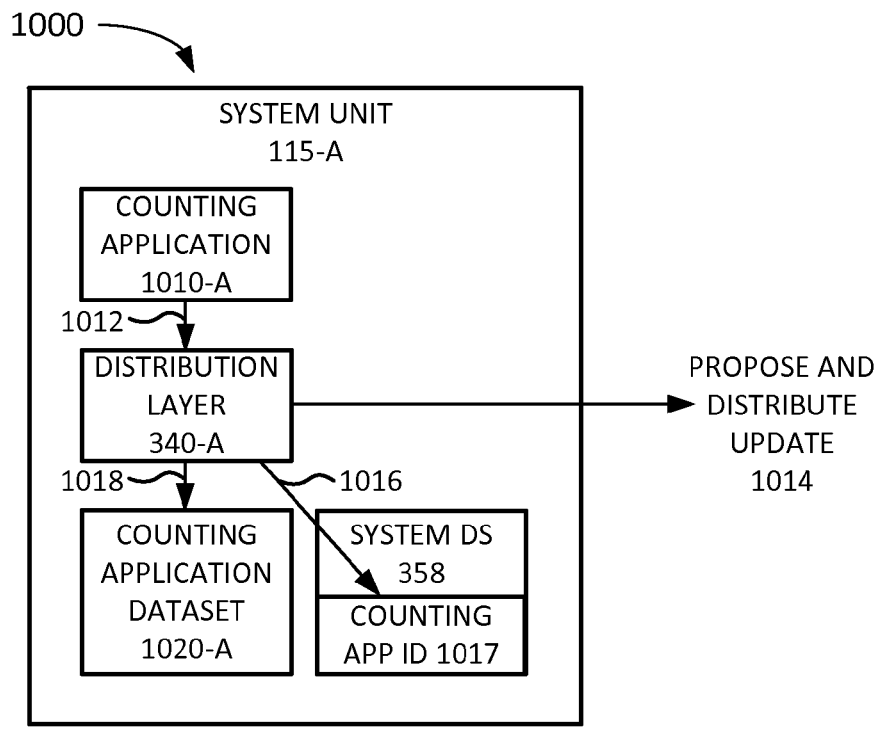
FIGS. 10A-10C are diagrams of an exemplary application dataset scenario according to one or more implementations.
Figure 10B:
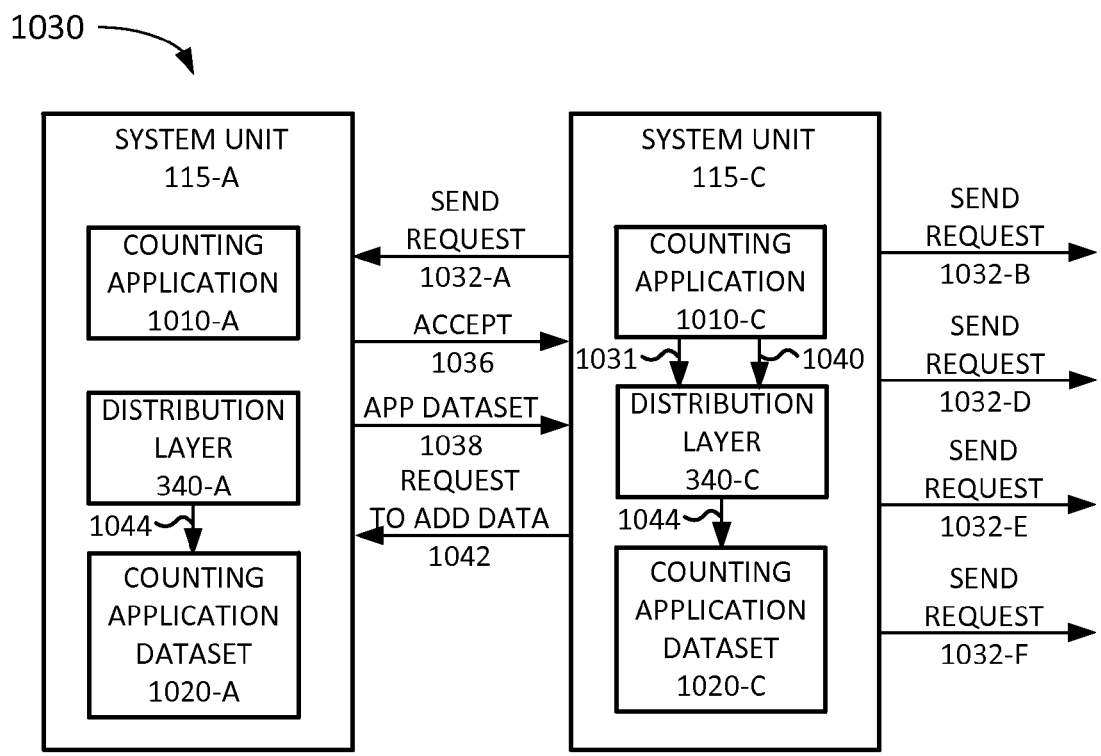
Figure 10C:
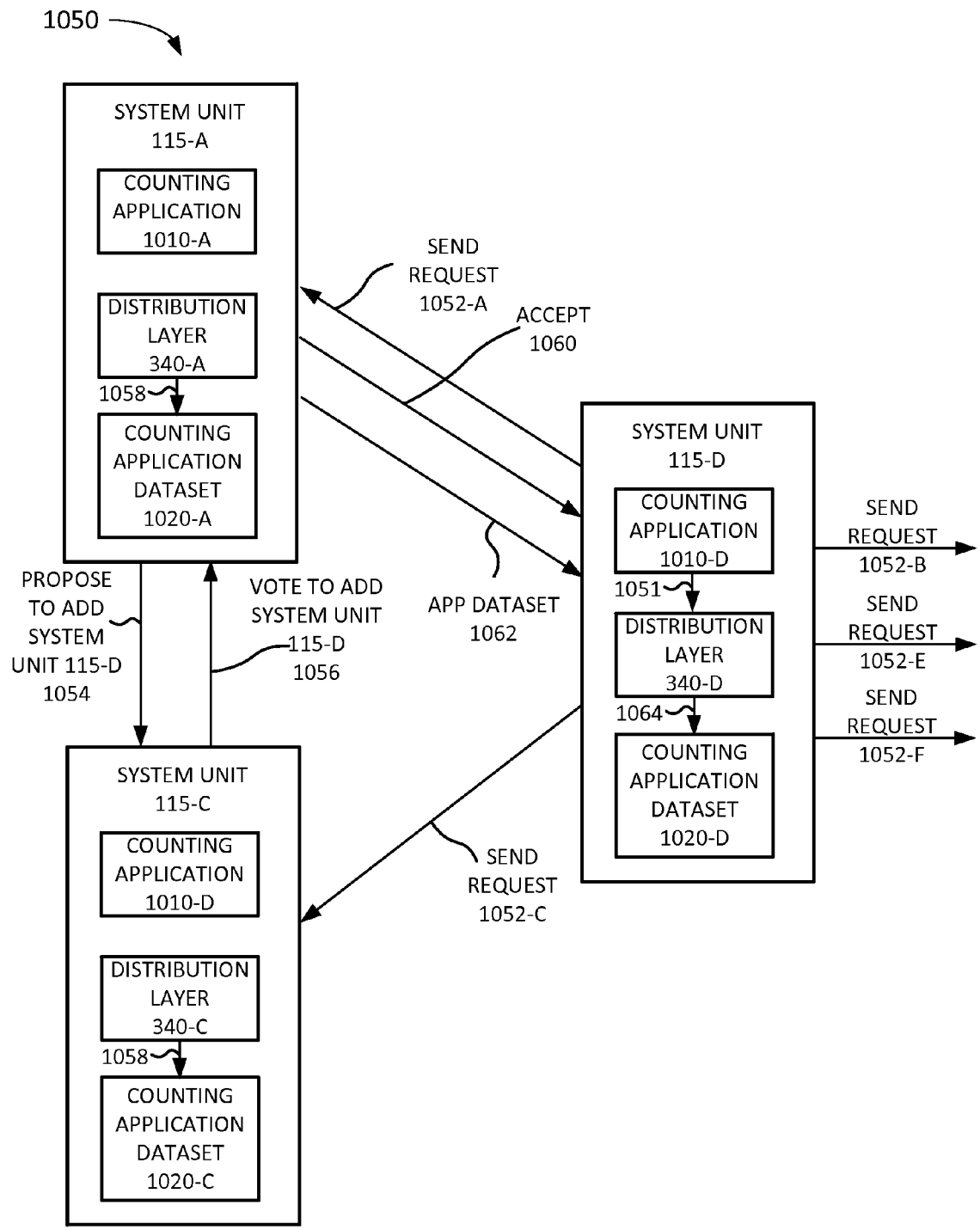

FIGS. 10A-10C are diagrams of an exemplary application dataset scenario according to one or more implementations. For example, assume that a people counting application is desired for room 920-C of FIG. 9. In order to count the number of people in room 920-C, people entering and leaving through any door into or out of room 920-C need to be counted. Thus, a people counting application needs to be installed in controllers 210 of system units 115-A, 115-C, and 115-D.

FIG. 10A illustrates signal flow scenario 1000 after counting application 1010-A is installed in system unit 115-A. After counting application 1010-A is installed in system unit 115-A, counting application 1010-A may request access to a distributed application dataset associated with counting application 1010-A via distribution layer 340 (signal 1012). Distribution layer 340-A may determine that an application dataset entry for counting application 1010 does not exist in system dataset 358. Thus, distribution layer 340-A may distribute a proposal to add an entry for a counting application dataset in system dataset 358 (signal 1014). After obtaining consensus for the proposed change, distribution layer 340-A may create a new entry in system dataset 358 (signal 1016) to create a counting application dataset ID entry 1017. The update to system dataset 358 will have been distributed to the other system units 115-B to 115-F via the proposal (signal 1014), which has now been accepted after consensus was reached. Distribution layer 340-A may proceed to create counting application dataset 1020-A in storage layer 350 (signal 1018). Counting application 1010-A may now use counting application dataset 1020-A via distribution layer 340-A.

FIG. 10B illustrates signal flow scenario 1030 after counting application 1010-C is installed in system unit 115-C. After counting application 1010-C is installed in system unit 115-C, counting application 1010-C may request to access a distributed application dataset associated with counting application 1010-C via distribution layer 340-C (signal 1031). Distribution layer 340-C may determine that an application dataset entry 1017 exists in system dataset 358. In response, system unit 115-C may send a request, to be added to the dataset group associated with counting application dataset 1020, to system unit 115-A (signal 1032-A), to system unit 115-B (signal 1032-B), to system unit 115-D (signal 1032-D), to system unit 115-E (signal 1032-E), and to system unit 115-F (signal 1032-F). Since only system unit 115-A is in the dataset group associated with counting application dataset 1020, only system unit 115-A will respond to the request.

Since system unit 115-A is the only system unit in the dataset group associated with counting application dataset 1020, any proposed changes to counting application dataset 1020 automatically receive consensus. Thus, system unit 115-A has consensus to accept the request and add system unit 115-C to the dataset group associated with counting application dataset 1020. System unit 115-A may add system unit 115-C to the dataset group associated with counting application dataset 1020-A (signal 1034) and may send an indication to system unit 115-C that system unit 115-C has been added to counting dataset group 1020 (signal 1036). In response, system unit 115-C may receive counting application dataset 1020 (signal 1038) and system unit 115-C may store the received counting application dataset 1020 in storage layer 350.

At a later time, counting application 1010-C may generate application data. For example, a person may have left room 920-C through the door associated with system unit 115-C and a sensor device associated with system unit 115-C may detect the leaving person. Counting application 1010-C may propose to add the generated application data in application dataset 1020-C via distribution layer 340-C (signal 1040). Since the only other system unit in the dataset group associated with counting application dataset 1020 is system unit 115-A, the proposal to add data is sent to system unit 115-A (signal 1042). System unit 115-A may vote for the change and system unit 115-C may thus obtain consensus by reaching the required quorum of 2 (by having automatically have voted for its own proposed change). As a result, the proposed change may thus be applied in both system unit 115-A and system unit 115-C. (signal 1044).

FIG. 10C illustrates signal flow scenario 1050 after counting application 1010-D is installed in system unit 115-D. After counting application 1010-D is installed in system unit 115-D, counting application 1010-D may request to access a distributed application dataset associated with counting application 1010-D via distribution layer 340-D (signal 1051). Distribution layer 340-D may determine that a counting application dataset ID entry 1017 exists in system dataset 358. In response, system unit 115-D may send a request, to be added to the dataset group associated with counting application dataset 1020, to system unit 115-A (signal 1052-A), to system unit 115-B (signal 1052-B), to system unit 115-C (signal 1052-C), to system unit 115-E (signal 1052-E), and to system unit 115-F (signal 1052-F). Since only system units 115-A and 115-C are associated with counting application dataset 1020, only system units 115-A and 115-C will respond to the request.

Since both system unit 115-A and system unit 115-C have received the request, both system unit 115-A and 115-C will propose to add system unit 115-D to the dataset group associated with counting application dataset 1020. Assume system unit 115-A receives and acts upon the received request before system unit 115-C. System unit 115-A will send a proposal to add system unit 115-D to system unit 115-C (signal 1054) and to itself. System unit 115-C will send a proposal to add system unit 115-D to system unit 115-A and to itself (not shown in FIG. 10C). Since the proposals sent by system unit 115-A are received first, the subsequent proposals from system unit 115-C are rejected. Thus, system unit 115-C will vote for the proposal from system unit 115-A and will reject its own proposal (signal 1056) and system unit 115-A will vote for its own proposal and reject the proposal from system unit 115-C (not shown in FIG. 10C). Thus, system unit 115-A will reach consensus for its proposal and system unit 115-D will be added to the dataset group associated with counting application dataset 1020 (signals 1058) and the change will be distributed as a result of the accepted proposal.

System unit 115-A may send an indication to system unit 115-D that system unit 115-D has been added to the dataset group associated with counting application dataset 1020 (signal 1060) and will provide counting application dataset 1020 to system unit 115-D (signal 1062). Distribution layer 340-D may store the received counting application dataset 1020 in storage layer 350 (signal 1064) The quorum requirement for the dataset group associated with counting application dataset 1020 need not be changed in this case.

This application incorporates by reference the following applications filed the same day as the present patent application: U.S. application Ser. No. 14/028,218, titled "Event Timeline Generation"; U.S. application Ser. No. 14/028,118, titled "Control System Configuration Within an Operational Environment"; U.S. application Ser. No. 14/028,236, titled "Anonymous Decisions in an Access Control System"; U.S. application Ser. No. 14/028,243, titled "Consensus Loss in Distributed Control Systems"; U.S. application Ser. No. 14/028,059, titled "Joining a Distributed Database"; U.S. application Ser. No. 14/028,198, titled "Distributed Events in an Access Control System"; and U.S. application Ser. No. 14/028,208, titled "Distribution of User Credentials".

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 5-7, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

The terms "comprises" and "comprising" specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a device in a distributed system, the method comprising:
    detecting, by the device, a request from an application to access an application dataset, wherein the application dataset corresponds to a distributed dataset;
    determining, by the device, whether an identifier for the application dataset is listed in a distributed system dataset of the distributed system;
    creating, by the device, an entry for the identifier for the application dataset in the distributed system dataset, in response to determining that the identifier for the application dataset is not listed in the distributed system dataset;
    creating, by the device, the application dataset in a storage layer of a system unit, in response to creating the entry for the identifier for the application dataset;
    adding, by the device, information from the application to the created application dataset, in response to creating the application dataset;
    sending, by the device and to other devices in the distributed system, a request to join a dataset group that includes devices associated with the application dataset, in response to determining that the identifier for the application dataset is listed in the distributed system dataset;
    receiving, by the device and from another device in the distributed system, an indication that the device has been added to the dataset group, based on sending the request to join the dataset group;
    sending, by the device, a proposal to devices that are members of the dataset group to add application data to the application dataset;
    obtaining, by the device, consensus to add the application data to the application dataset, in response to sending the proposal; and
    adding, by the device, the application data to the application dataset, in response to obtaining the consensus.

2. The method of claim 1, wherein determining whether the identifier for the application dataset is listed in the distributed system dataset of distributed system includes:
accessing a list of identifiers of distributed datasets in the distributed system dataset; and
determining whether the list of identifiers of distributed datasets includes the identifier for the requested application dataset.

3. The method of claim 1, further comprising:
receiving, from the other device in the distributed system, the application dataset; and
storing the received application dataset on the device.

4. The method of claim 1, further comprising:
receiving, from another device in the distributed system, a request to join a dataset group of devices associated with the created application dataset;
obtaining consensus to add the other device to the dataset group of devices associated with the created application dataset; and
adding the other device to the dataset group of devices associated with the created application dataset, in response to obtaining the consensus to add the other device to the dataset group of devices associated with the created application dataset.

5. The method of claim 4, wherein obtaining consensus to add the other device to the dataset group of devices associated with the created application dataset includes:
sending a proposal to add the other device to the dataset group of devices associated with the created application dataset to the devices associated with the created application dataset; and
obtaining a quorum of votes to add the other device to the dataset group of devices associated with the created application dataset.

6. The method of claim 4, wherein adding the other device to the dataset group of devices associated with the created application dataset includes:
sending the application dataset to the other device; and
adjusting a quorum number required to obtain consensus in connection with the dataset group of devices associated with the created application dataset.

7. The method of claim 4, further comprising:
receiving, from the other device in the distributed system, a request to change application data in the created application dataset;
obtaining consensus to change the application data in the created application dataset; and
changing the application data in the created application dataset, in response to obtaining the consensus to change the application data in the created application dataset.

8. The method of claim 4, further comprising:
receiving, from the other device in the distributed system, a request to be removed from the dataset group of devices associated with the created application dataset;
obtaining consensus to remove the other device from the dataset group of devices associated with the created application dataset; and
removing the other device from the dataset group of devices associated with the created application dataset, in response to obtaining the consensus to remove the other device from the dataset group of devices associated with the created application dataset.

9. The method of claim 1, wherein the distributed system includes a distributed physical access control system, and wherein the device and the other devices correspond to physical access control units.

10. A device in a distributed system, the device comprising:
a memory storing instructions; and
a processor configured to execute the instructions to:
detect a request from an application to access an application dataset, wherein the application dataset corresponds to a distributed dataset;
determine whether an identifier for the application dataset is listed in a distributed system dataset of the distributed system;
create an entry for the identifier for the application dataset in the distributed system dataset, in response to determining that the application dataset is not listed in the distributed system dataset;
create the application dataset in a storage layer of the device, in response to creating the entry for the identifier for the application dataset;
add information from the application to the created application dataset, in response to creating the application dataset;
send, to other devices in the distributed system, a request to join a dataset group that includes devices associated with the application dataset, in response to determining that the identifier for the application dataset is listed in the distributed system dataset;
receive, from another device in the distributed system, a request to join the dataset group of devices associated with the created application dataset;
obtain consensus to add the other device to the dataset group of devices associated with the created application dataset; and
add the other device to the dataset group of devices associated with the created application dataset, in response to obtaining the consensus to add the other device to the dataset group of devices associated with the created application dataset.

11. The device of claim 10, wherein, when the processor is determining whether an identifier for the application dataset is listed in a distributed system dataset of the distributed system, the processor is further configured to execute the instructions to:
access a list of identifiers of distributed datasets in the distributed system; and
determine whether the list of identifiers of distributed datasets includes the identifier for the requested application dataset.

12. The device of claim 10, wherein the processor is further configured to execute the instructions to:
receive, from another device in the distributed system, an indication that the device has been added to the dataset group;
receive, from the other device in the distributed system, the application dataset; and
store the received application dataset on the device.

13. The device of claim 12, wherein the received application dataset includes a list of devices that are members of the dataset group, and wherein the processor is further configured to execute the instructions to:
send a proposal to the devices that are members of the dataset group to add application data to the application dataset;
obtain consensus to add the application data to the application dataset, in response to sending the proposal; and
add the application data to the application dataset, in response to obtaining the consensus.

14. The device of claim 10, wherein the processor is further configured to execute the instructions to:

receive, from the other device in the distributed system, a request to be removed from the dataset group of devices associated with the created application dataset;

obtain consensus to remove the other device from the dataset group of devices associated with the created application dataset; and remove the other device from the dataset group of devices associated with the created application dataset, in response to obtaining the consensus to remove the other device from the dataset group of devices associated with the created application dataset.

15. The device of claim 10, wherein the distributed system includes a distributed physical access control system, and wherein the device and the other devices correspond to physical access control units.

16. A distributed system comprising:

a plurality of physical access control devices, wherein a particular one of the plurality of physical access control devices is configured to:

detect a request from an application to access an application dataset, wherein the application dataset corresponds to a distributed dataset;

determine whether an identifier for the application dataset is listed in a distributed system dataset of the distributed system;

create an entry for the identifier for the application dataset in the distributed system dataset, in response to determining that the application dataset is not listed in the distributed system dataset;

create the application dataset in a storage layer of the particular one of the plurality of physical access control devices, in response to creating the entry for the identifier for the application dataset;

add information from the application to the created application dataset, in response to creating the application dataset;

send, to other ones of the plurality of physical access control devices, a request to join a dataset group that includes devices associated with the application dataset, in response to determining that the identifier for the application dataset exists in the distributed system dataset;

receive, from another one of the plurality of physical access control devices, an indication that the particular one of the plurality of physical access control devices has been added to the dataset group;

send a proposal to the other ones of the plurality of physical access control devices that are members of the dataset group to add application data to the application dataset;

obtain consensus to add the application data to the application dataset, in response to sending the proposal; and add the application data to the application dataset, in response to obtaining the consensus.

17. The distributed system of claim 16, wherein the particular one of the plurality of physical access control devices is further configured to:

receive, from the other one of the plurality of physical access control devices, the application dataset; and store the received application dataset on the particular one of the plurality of physical access control devices.

18. A method, performed by a device in a distributed system, the method comprising:

detecting, by the device, a request from an application to access an application dataset, wherein the application dataset corresponds to a distributed dataset;

determining, by the device, whether an identifier for the application dataset is listed in a distributed system dataset of the distributed system;

creating, by the device, an entry for the identifier for the application dataset in the distributed system dataset, in response to determining that the identifier for the application dataset is not listed in the distributed system dataset;

creating, by the device, the application dataset in a storage layer of a system unit, in response to creating the entry for the identifier for the application dataset;

adding, by the device, information from the application to the created application dataset, in response to creating the application dataset;

sending, by the device and to other devices in the distributed system, a request to join a dataset group that includes devices associated with the application dataset, in response to determining that the identifier for the application dataset is listed in the distributed system dataset;

receiving, by the device and from another device in the distributed system, a request to join the dataset group of devices associated with the created application dataset;

obtaining, by the device, consensus to add the other device to the dataset group of devices associated with the created application dataset; and adding, by the device, the other device to the dataset group of devices associated with the created application dataset, in response to obtaining the consensus to add the other device to the dataset group of devices associated with the created application dataset.

19. The method of claim 18, wherein obtaining consensus to add the other device to the dataset group of devices associated with the created application dataset includes:

sending a proposal to add the other device to the dataset group of devices associated with the created application dataset to the devices associated with the created application dataset; and obtaining a quorum of votes to add the other device to the dataset group of devices associated with the created application dataset.

20. The method of claim 18, wherein adding the other device to the dataset group of devices associated with the created application dataset includes:

sending the application dataset to the other device; and adjusting a quorum number required to obtain consensus in connection with the dataset group of devices associated with the created application dataset.

21. The method of claim 18, further comprising:

receiving, from the other device in the distributed system, a request to change application data in the created application dataset;

obtaining consensus to change the application data in the created application dataset; and changing the application data in the created application dataset, in response to obtaining the consensus to change the application data in the created application dataset.

22. The method of claim 18, further comprising:

receiving, from the other device in the distributed system, a request to be removed from the dataset group of devices associated with the created application dataset;

obtaining consensus to remove the other device from the dataset group of devices associated with the created application dataset; and removing the other device from the dataset group of devices associated with the created application dataset, in response to obtaining the consensus to remove the other device from the dataset group of devices associated with the created application dataset.

23. The method of claim 18, wherein the distributed system includes a distributed physical access control system, and wherein the device and the other devices correspond to physical access control units.

24. A device in a distributed system, the device comprising:
a memory storing instructions; and
a processor configured to execute the instructions to:
detect a request from an application to access an application dataset, wherein the application dataset corresponds to a distributed dataset;
determine whether an identifier for the application dataset is listed in a distributed system dataset of the distributed system;
create an entry for the identifier for the application dataset in the distributed system dataset, in response to determining that the application dataset is not listed in the distributed system dataset;
create the application dataset in a storage layer of the device, in response to creating the entry for the identifier for the application dataset;
add information from the application to the created application dataset, in response to creating the application dataset;
send, to other devices in the distributed system, a request to join a dataset group that includes devices associated with the application dataset, in response to determining that the identifier for the application dataset is listed in the distributed system dataset;
receive, and from another device in the distributed system, an indication that the device has been added to the dataset group, based on sending the request to join the dataset group;
send a proposal to devices that are members of the dataset group to add application data to the application dataset;
obtain consensus to add the application data to the application dataset, in response to sending the proposal; and
add the application data to the application dataset, in response to obtaining the consensus.

25. The device of claim 24, wherein, when the processor is determining whether an identifier for the application dataset is listed in a distributed system dataset of the distributed system, the processor is further configured to execute the instructions to:
access a list of identifiers of distributed datasets in the distributed system; and
determine whether the list of identifiers of distributed datasets includes the identifier for the requested application dataset.

26. The device of claim 24, wherein the distributed system includes a distributed physical access control system, and wherein the device and the other devices correspond to physical access control units.

* * * * *